US012398447B2

(12) United States Patent
Kanazawa et al.

(10) Patent No.: US 12,398,447 B2
(45) Date of Patent: Aug. 26, 2025

(54) TUNGSTEN WIRE, SAW WIRE, AND TUNGSTEN WIRE FOR SCREEN PRINTING

(71) Applicant: Panasonic Intellectual Property Management Co., Ltd., Osaka (JP)

(72) Inventors: Tomohiro Kanazawa, Osaka (JP); Naoki Kohyama, Osaka (JP); Kenshi Tsuji, Osaka (JP); Yoshihiro Iguchi, Osaka (JP); Yui Nakai, Osaka (JP); Tetsuya Nakaaze, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 435 days.

(21) Appl. No.: 17/925,071

(22) PCT Filed: May 26, 2021

(86) PCT No.: PCT/JP2021/020084

§ 371 (c)(1),
(2) Date: Nov. 14, 2022

(87) PCT Pub. No.: WO2021/256204

PCT Pub. Date: Dec. 23, 2021

(65) Prior Publication Data

US 2023/0227951 A1 Jul. 20, 2023

(30) Foreign Application Priority Data

Jun. 19, 2020 (JP) ................................ 2020-106591

(51) Int. Cl.
*C22C 27/04* (2006.01)
*C22C 1/04* (2023.01)
(Continued)

(52) U.S. Cl.
CPC .............. *C22C 27/04* (2013.01); *C22C 1/045* (2013.01); *C22F 1/18* (2013.01); *B28D 5/045* (2013.01); *B41F 15/34* (2013.01); *C25F 3/26* (2013.01)

(58) Field of Classification Search
CPC .... C22C 27/04; B28D 5/045; B22F 2005/001
See application file for complete search history.

(56) References Cited

U.S. PATENT DOCUMENTS

2011/0319931 A1 12/2011 Esaki
2018/0281231 A1 10/2018 Kanazawa et al.
(Continued)

FOREIGN PATENT DOCUMENTS

CN 102341515 B 12/2014
CN 209955028 U 1/2020
JP 5485259 B2 5/2014
JP 2014-169499 A 9/2014
WO 2020/137255 A1 7/2020

OTHER PUBLICATIONS

English Abstract and English Machine Translation of Motoaki (CN 102341515 A) (Feb. 1, 2012).*
(Continued)

*Primary Examiner* — Jessee R Roe
(74) *Attorney, Agent, or Firm* — Renner, Otto, Boisselle & Sklar, LLP

(57) ABSTRACT

A tungsten wire that contains tungsten or a tungsten alloy is provided. An average width of surface crystal grains in a direction perpendicular to an axis of the tungsten wire is at most 98 nm. The tungsten wire has a tensile strength of at least 3900 MPa. The tungsten wire has a diameter of at least 100 μm and at most 225 μm.

4 Claims, 11 Drawing Sheets

(51) Int. Cl.

| | |
|---|---|
| ***C22F 1/18*** | (2006.01) |
| *B28D 5/04* | (2006.01) |
| *B41F 15/34* | (2006.01) |
| *C25F 3/26* | (2006.01) |

(56) References Cited

U.S. PATENT DOCUMENTS

| | | | |
|---|---|---|---|
| 2018/0361017 A1 | 12/2018 | Roth | |
| 2019/0232404 A1* | 8/2019 | Kanazawa ......... | B23D 57/0007 |
| 2020/0070583 A1 | 3/2020 | Shibata et al. | |
| 2022/0098708 A1 | 3/2022 | Kanazawa et al. | |

OTHER PUBLICATIONS

International Search Report for corresponding Application No. PCT/JP2021/020084, mailed Aug. 10, 2021.
Written Opinion for corresponding Application No. PCT/JP2021/020084, mailed Aug. 10, 2021.
Chinese Office Action dated Jun. 22, 2023 in corresponding Chinese Application No. 202180036096.5, with Machine translation.
European Extended Search Report for corresponding Application No. 21826245.9, mailed Oct. 31, 2023.
Indian Office Action dated Oct. 29, 2024 in corresponding Indian Application No. 202217065120.

* cited by examiner

<Working Example 1: Tensile strength is 5230 MPa,
Processing rate of drawing at room temperature is 70%>

<Working Example 2: Tensile strength is 5820 MPa,
Processing rate of drawing at room temperature is 90%>

<Working Example 3: Tensile strength is 4980 MPa,
Processing rate of drawing at room temperature is 70%>

<Working Example 4: Tensile strength is 4500 MPa,
Processing rate of drawing at room temperature is 70%>

<Working Example 5: Tensile strength is 3910 MPa, Processing rate of drawing at room temperature is 70%>

TUNGSTEN WIRE, SAW WIRE, AND TUNGSTEN WIRE FOR SCREEN PRINTING

TECHNICAL FIELD

The present invention relates to a tungsten wire, a saw wire, and a tungsten wire for screen printing.

BACKGROUND ART

Medical needles including a tungsten alloy wire having a high tensile strength with an increased alloy ratio to tungsten have conventionally been known (see, for example, Patent Literature (PTL) 1). PTL 1 discloses that a tungsten alloy wire having a diameter of 0.10 mm has a maximum tensile strength of 4459.0 N/mm$^2$ (=MPa).

CITATION LIST

Patent Literature

[PTL 1] Japanese Unexamined Patent Application Publication No. 2014-169499

SUMMARY OF INVENTION

Technical Problem

A tungsten wire that has a higher tensile strength than a tensile strength of a tungsten wire of conventional techniques has been required for effective use in various areas in addition to medical needles. Tungsten is chemically more stable and has a higher elastic modulus and a higher melting point than a piano wire which has the greatest strength as a metal wire. Such tungsten has great industrial potential.

In view of the above, an object of the present invention is to provide a tungsten wire, a saw wire, and a tungsten wire for screen printing each having a higher tensile strength than a general tensile strength of a piano wire.

Solution to Problem

A tungsten wire according to an aspect of the present invention is a tungsten wire containing tungsten or a tungsten alloy. In the tungsten wire, an average width of surface crystal grains in a direction perpendicular to an axis of the tungsten wire is at most 98 nm, a tensile strength of the tungsten wire is at least 3900 MPa, and a diameter of the tungsten wire is larger than 100 μm and at most 225 μm.

In addition, a tungsten wire according to an aspect of the present invention is a tungsten wire containing tungsten or a tungsten alloy. In the tungsten wire, an average width of surface crystal grains in a direction perpendicular to an axis of the tungsten wire is at most 98 nm, a tensile strength of the tungsten wire is at least 3900 MPa, a diameter of the tungsten wire is at least 18 μm and at most 225 μm, and $T \geq 4758 \times D^2 - 7258.3 \times D + 5275.5$ is satisfied where T is the tensile strength in MPa and D is the diameter in mm.

A saw wire according to an aspect of the present invention includes the above-described tungsten wire.

A tungsten wire for screen printing according to an aspect of the present invention includes the above-described tungsten wire.

Advantageous Effects of Invention

The present invention makes it possible to provide a tungsten wire, etc. having a higher tensile strength than a general tensile strength of a piano wire.

DESCRIPTION OF EMBODIMENTS

The following describes in detail a tungsten wire, a saw wire, and a tungsten wire for screen printing according to an embodiment of the present invention, with reference to the drawings. It should be noted that each of the embodiments described below shows a specific example of the present invention. As such, the numerical values, shapes, materials, structural components, the arrangement and connection of the structural components, steps, the processing order of the steps, and so on, shown in the following embodiments are mere examples, and therefore do not limit the present invention. Among the structural components in the embodiments described below, those not recited in the independent claims will be described as optional structural components.

The drawings are schematic diagrams and do not necessarily give strict illustration. Accordingly, for example, scale sizes, etc. are not necessarily exactly represented. In each of the diagrams, substantially the same structural components are assigned with the same reference signs, and redundant descriptions will be omitted or simplified.

In addition, a term, such as "perpendicular" or "identical", representing a relationship between the components as well as a term, such as "circular", representing a form, and a numerical range are used in the present description. Such terms and range are each not representing only a strict meaning of the term or range, but implying that a substantially same range, e.g., a range that includes even a difference as small as few percentages, is connoted in the term or range.

EMBODIMENT

Tungsten Wire

First, a configuration of a tungsten wire according to the present embodiment will be described.

Figure 1:
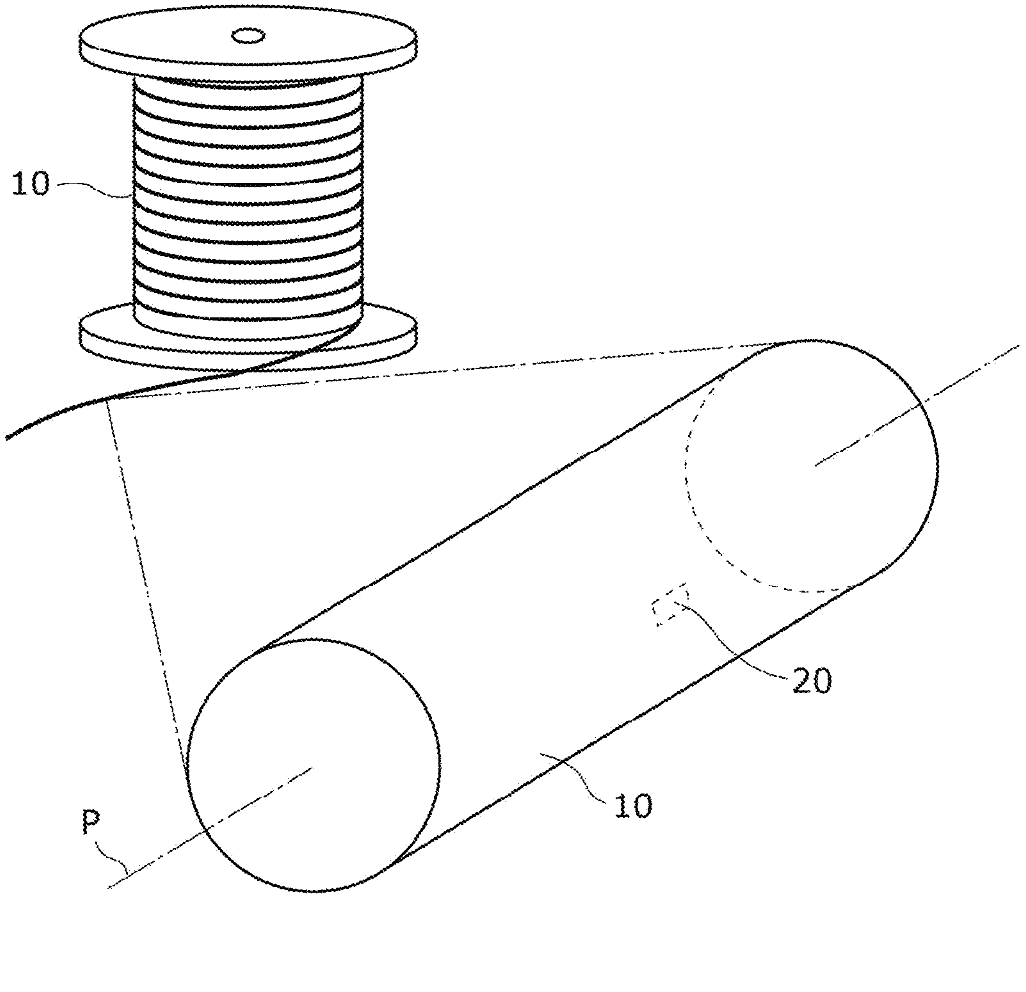
FIG. 1 is a perspective view schematically illustrating a tungsten wire according to an embodiment.
Figure 2A:
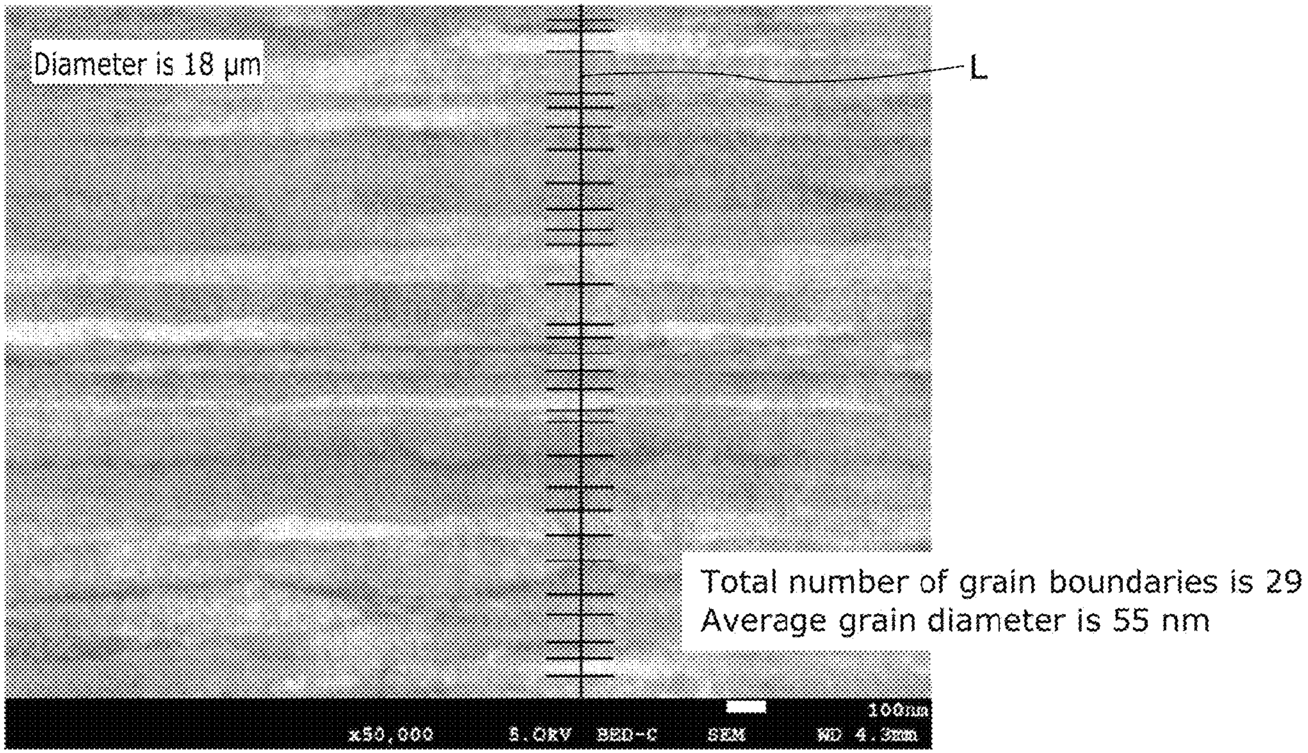
FIG. 2A is a diagram illustrating an enlarged view of a surface of a tungsten wire according to Working Example 1.
Figure 2B:
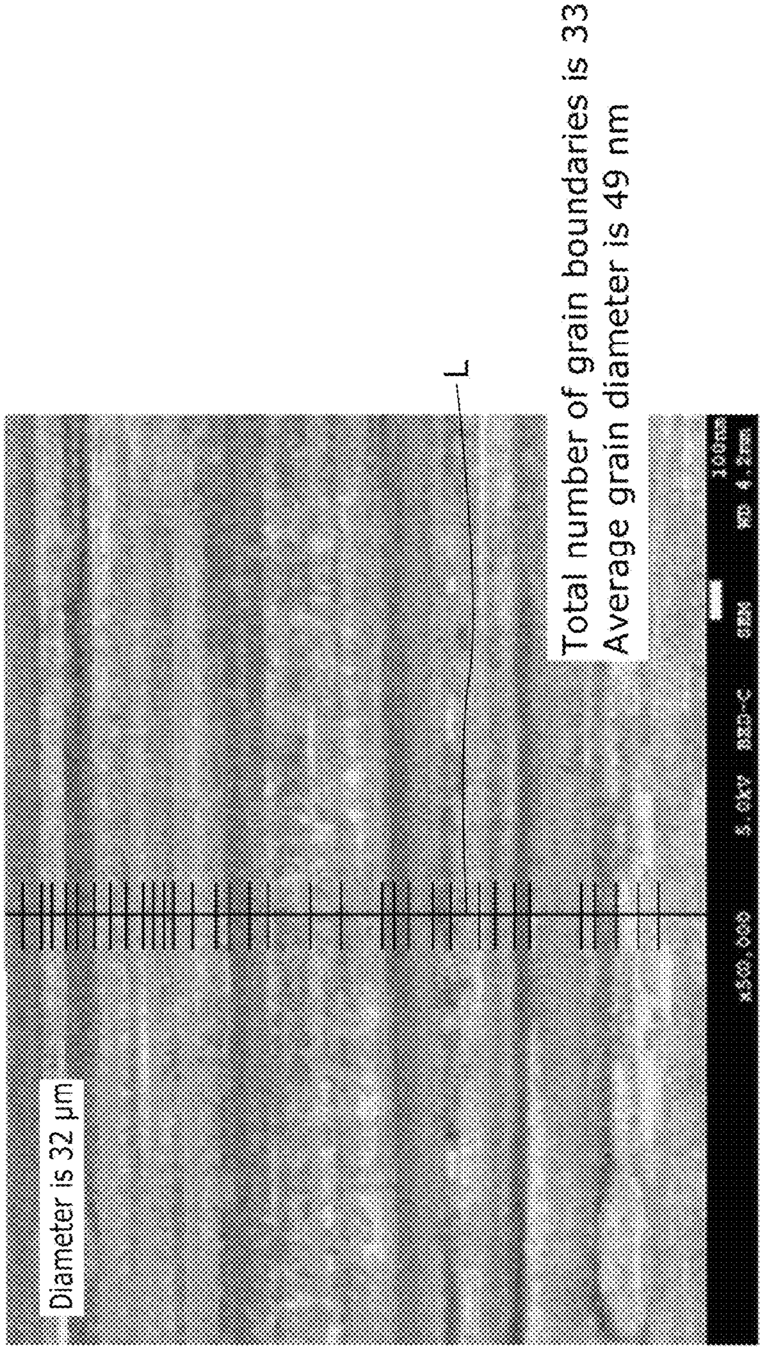
FIG. 2B is a diagram illustrating an enlarged view of a surface of a tungsten wire according to Working Example 2.
Figure 2C:
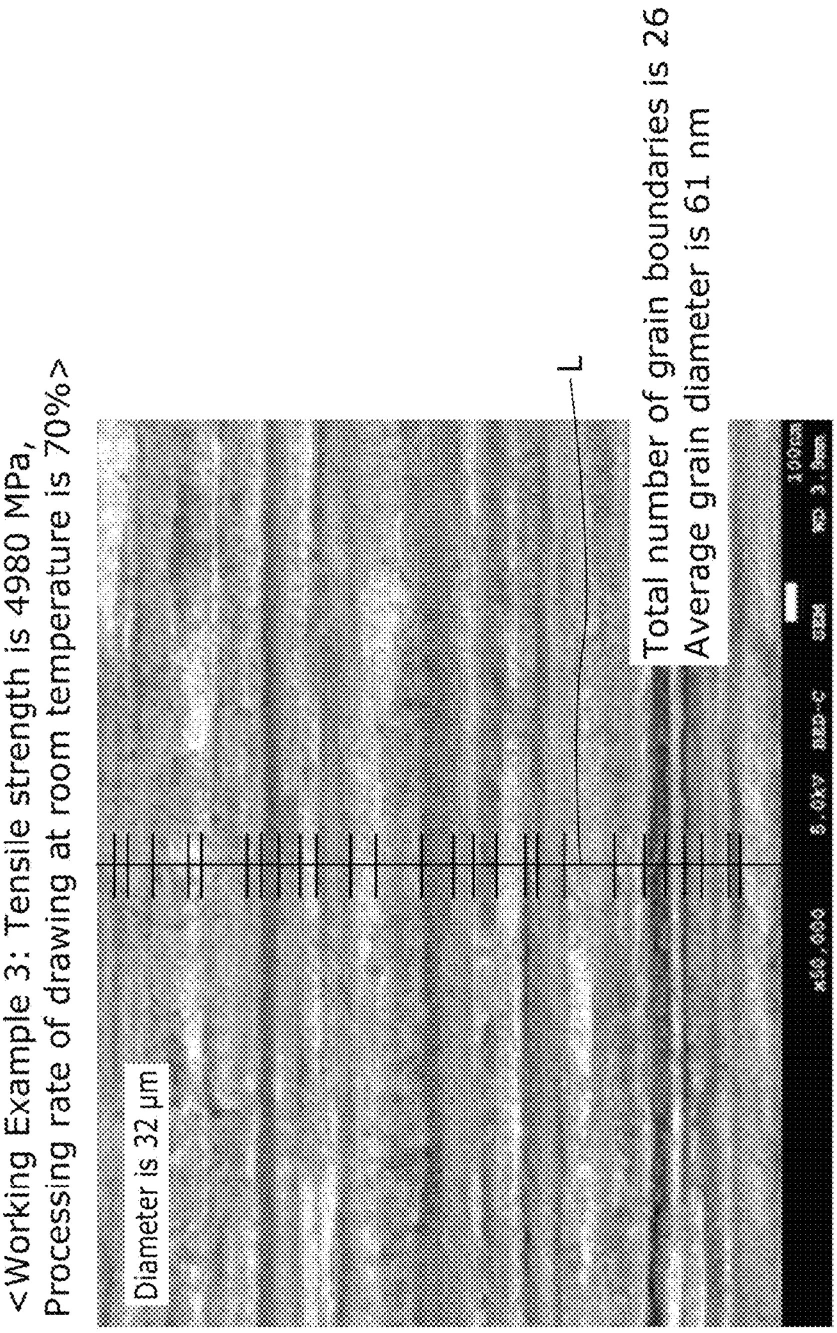
FIG. 2C is a diagram illustrating an enlarged view of a surface of a tungsten wire according to Working Example 3.
Figure 2D:
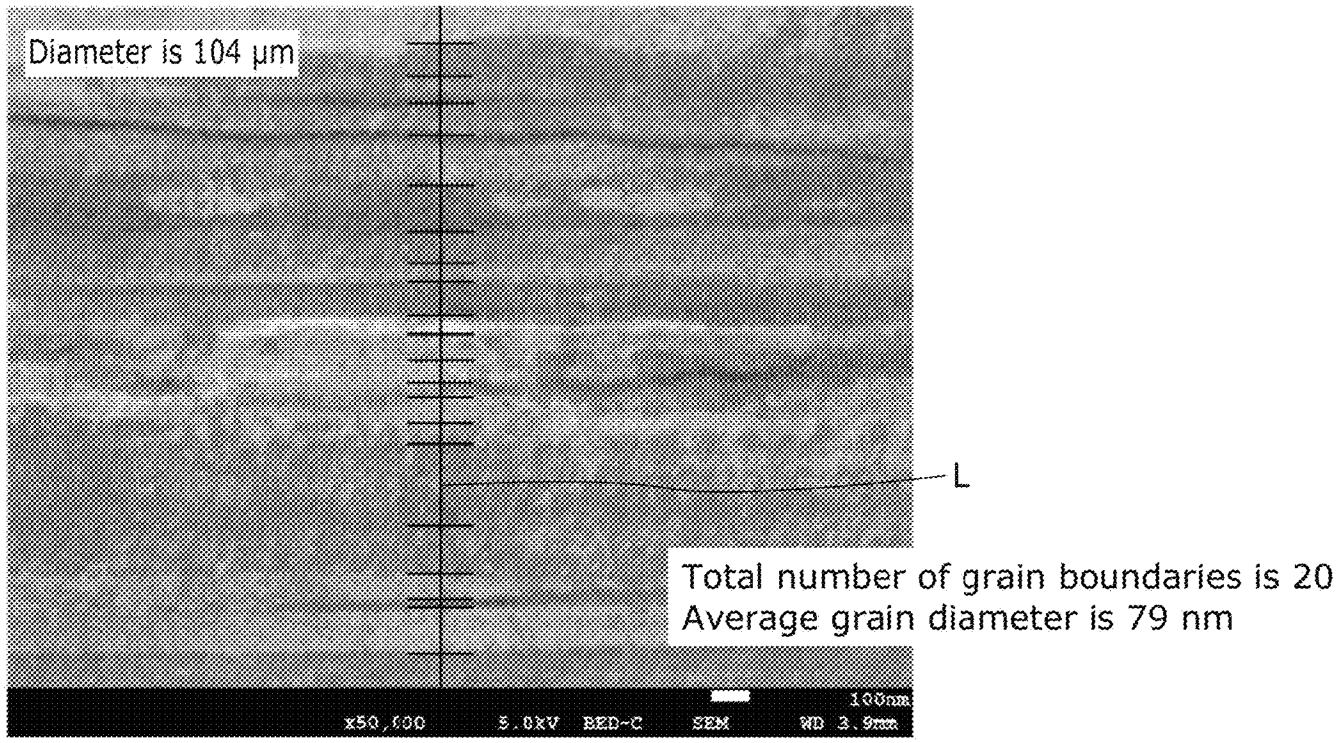
FIG. 2D is a diagram illustrating an enlarged view of a surface of a tungsten wire according to Working Example 4.
Figure 2E:
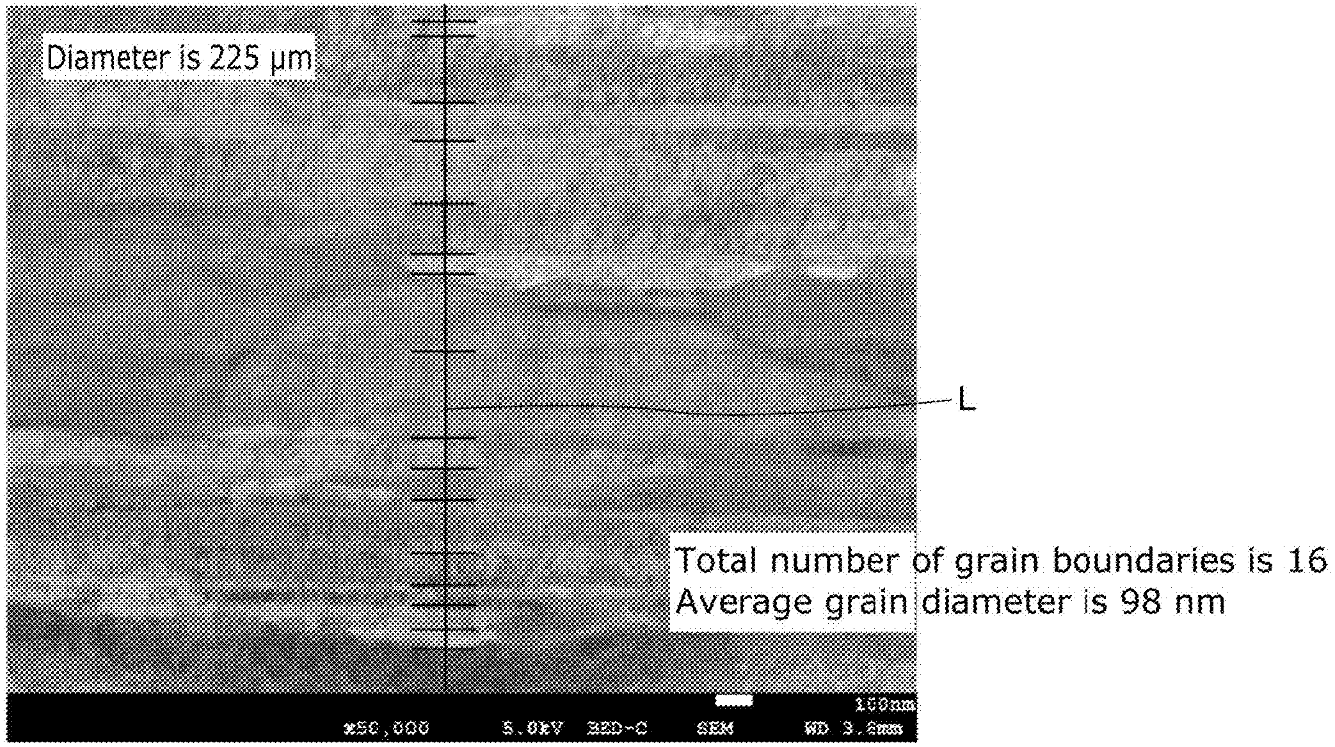
FIG. 2E is a diagram illustrating an enlarged view of a surface of a tungsten wire according to Working Example 5.

FIG. 1 is a perspective view schematically illustrating tungsten wire 10 according to the present embodiment. FIG. 1 illustrates an example in which tungsten wire 10 is wound around a winding core material. In addition, FIG. 1 schematically illustrates a partially enlarged view of tungsten wire 10.

Tungsten wire 10 according to the present embodiment contains tungsten (W) or a tungsten alloy. A tungsten content of tungsten wire 10 is, for example, at least 99 wt %. The tungsten content may be at least 99.5 wt %, at least 99.9 wt %, or at least 99.99 wt %. It should be noted that the tungsten content is the ratio of a weight of tungsten to a total weight of tungsten wire 10. The same holds true for the content of the other metal elements, etc. such as rhenium (Re) and potassium (K) which will be described later.

The tungsten alloy is, for example, an alloy containing rhenium and tungsten, namely, a ReW alloy. It is possible to enhance the tensile strength of tungsten wire 10 as the rhenium content increases. It should be noted that, in the case where the rhenium content is excessively high, for example, in the case where the rhenium content exceeds 9 wt %, wire breakage is caused when tungsten wire 10 is rendered thinner while maintaining a high tensile strength of tungsten wire 10, which makes it difficult to perform drawing in long lengths.

According to the present embodiment, the rhenium content of tungsten wire 10 is at least 0.1 wt % and at most 1 wt %. For example, the rhenium content may be greater than or equal to 0.5 wt %.

It should be noted that tungsten wire 10 may contain inevitable impurities which are inevitable through the processes of manufacturing. Furthermore, the tungsten content may be less than 99 wt %. The rhenium content may be greater than 1 wt %.

Tungsten wire 10 has a diameter less than or equal to 225 μm. For example, the diameter of tungsten wire 10 is larger than 100 μm and at most 225 μm. Tungsten wire 10 may have a diameter less than or equal to 100 μm. The diameter of tungsten wire 10 may be at least 18 μm and at most 225 μm.

According to the present embodiment, the diameter of tungsten wire 10 is constant. However, the diameter of tungsten wire 10 need not necessarily be completely constant, and may differ at different portions along the axis by a certain percentage such as 1%. As illustrated in FIG. 1, tungsten wire 10 has, for example, a circular cross-section shape in the cross section orthogonal to axis P. The cross-section shape of tungsten wire 10 may be a square, a rectangle, an oval, or the like.

In addition, an elastic modulus of tungsten wire 10 is at least 350 GPa and at most 450 GPa. Here, the elastic modulus is a longitudinal elastic modulus. An elastic modulus of piano wire is generally in a range of from 150 GPa to 250 GPa. In other words, tungsten wire 10 has an elastic modulus approximately twice as high as that of piano wire. When the elastic modulus is approximately twice as high as that of piano wire, it means that the amount of deflection of tungsten wire is approximately half of the amount of deflection of piano wire at the same diameter. It should be noted that the amount of deflection is the amount of deflection of a tungsten wire or piano wire when the tungsten wire or the piano wire is supported at both ends, and is obtained by approximating each wire as a "beam". If the amount of deflection is the same, the diameter of tungsten wire 10 is approximately 84% when the diameter of piano wire is 100%, making it possible to render the diameter of tungsten wire 10 thinner by approximately 16%. When tungsten wire 10 is used as a saw wire, it is possible to reduce the machining allowance.

As having an elastic modulus higher than or equal to 350 GPa, tungsten wire 10 is resistant to deformation. Stated differently, tungsten wire 10 is less likely to elongate. Meanwhile, by having an elastic modulus lower than or equal to 450 GPa, it is possible to transform tungsten wire 10 even if the elastic modulus is high, because the elongation (distortion) in the elastic range increases when the tensile strength (stress) is sufficiently high. Specifically, since tungsten wire 10 can be bent, when tungsten wire 10 is used as a saw wire, for example, it is possible to easily loop the saw wire over a guide roller or the like.

Tungsten wire 10 containing tungsten or a tungsten alloy has a tensile strength of at least 3900 MPa. The tensile strength of tungsten wire 10 may be at least 5000 MPa, or may be at least 5300 MPa. The tensile strength of tungsten wire 10 has a predetermined correlation to each of the rhenium content, the diameter, and the average width of surface crystal grains in tungsten wire 10. For this reason, it is possible to set the tensile strength of tungsten wire 10 to a desired value by adjusting at least one of the rhenium content, the diameter, and the average width of surface crystal grains as appropriate. For example, it is possible to implement tungsten wire 10 having a high tensile strength exceeding approximately 5500 MPa. The following describes a relationship between the tensile strength and various parameters.

Average Width of Surface Crystal Grains

First, the relationship between the tensile strength of the tungsten wire and the average width of surface crystal grains will be described.

A surface crystal grain is a crystal grain of tungsten or a tungsten alloy on the surface of a tungsten wire. In the tungsten wire according to the present embodiment, the average width of surface crystal grains in a direction perpendicular to axis P is less than or equal to 98 nm. The width of a surface crystal grain in the direction perpendicular to axis P is the length of a surface crystal grain along the direction perpendicular to axis P.

The following describes a relationship between a tensile strength and a width of a surface crystal grain of samples of a plurality of tungsten wires manufactured by the inventors.

FIG. 2A to FIG. 2E are diagrams respectively illustrating the enlarged views of the surface of tungsten wire according to Working Examples 1 to 5. Each of the diagrams illustrates a scanning electron microscope (SEM) image of the surface of a tungsten wire. The region illustrated by each of the diagrams corresponds to the quadrilateral region enclosed by the dashed line on surface 20 of tungsten wire 10, for example, as illustrated in FIG. 1. In each of the diagrams, a region of a uniform density (color) indicates a single crystal grain. The horizontal direction in the figure in each of the diagrams is the direction parallel to axis P. The crystal grains elongatedly extend in the direction along axis P.

In each of the diagrams, solid line L in proximity to the center is a straight line extending in the direction perpendicular to axis P. The average width of the surface crystal grains is calculated by counting a total number of boundaries between crystal grains (i.e., grain boundaries) along solid line L within the range indicated in each of the diagrams. More specifically, the average width of the surface crystal grains is calculated by dividing the length of solid line L in the counting range by the number resulting from adding 1 to the total number of grain boundaries. It should be noted that, in each of the diagrams, a plurality of short lines perpendicular to solid line L each represents a grain boundary.

Table 1 shows the relationship between a tensile strength and an average width of the surface crystal grains calculated based on the result of counting the total number of grain boundaries.

TABLE 1

| | Tensile strength [MPa] | Total number of grain boundaries | Average width of surface crystal grains [nm] | Diameter [μm] | Processing rate [%] |
|---|---|---|---|---|---|
| Working Example 1 | 5230 | 29 | 55 | 18 | 70 |
| Working Example 2 | 5820 | 33 | 49 | 32 | 90 |
| Working Example 3 | 4980 | 26 | 61 | 32 | 70 |
| Working Example 4 | 4500 | 20 | 79 | 104 | 70 |
| Working Example 5 | 3910 | 16 | 98 | 225 | 70 |

It should be noted that Working Examples 1 to 5 indicated in Table 1 are tungsten wires of 99.5 wt %. The processing rates indicated in Table 1 are processing rates of drawing at room temperature. The details of the processing rates will be explained later, along with the manufacturing method of a tungsten wire.

Figure 3:
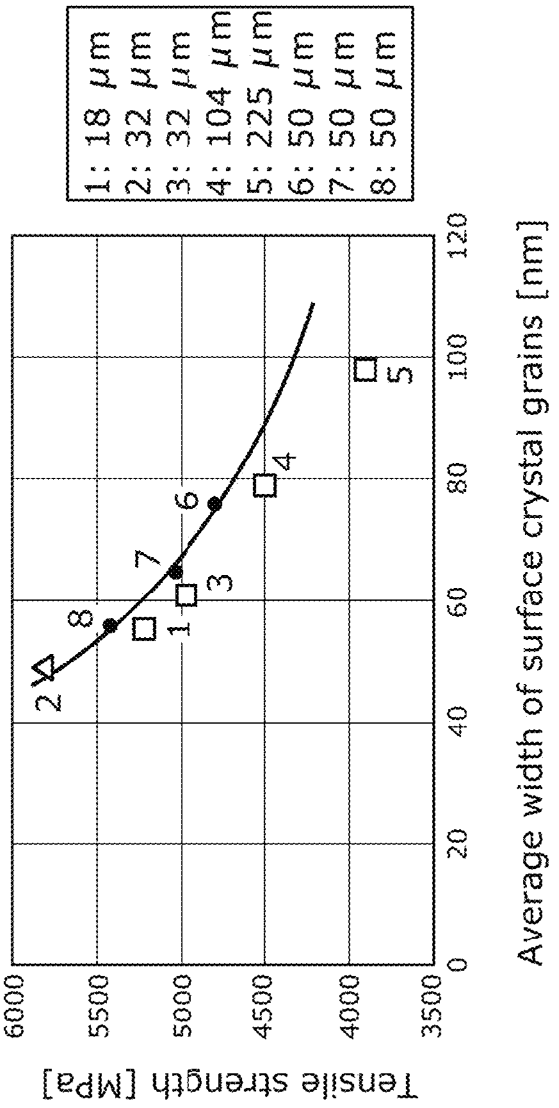
FIG. 3 is a diagram illustrating a relationship between a tensile strength and an average width of surface crystal grains.

FIG. 3 is a diagram illustrating a relationship between a tensile strength and an average width of surface crystal grains. In FIG. 3, the horizontal axis represents an average width of surface crystal grains in nm, and the vertical axis represents a tensile strength in MPa. In addition, the numerical values 1 to 8 provided beside the respective plots in FIG. 3 mean that the respective plots are the results of the measurement of Working Examples 1 to 8.

As illustrated in Table 1 and FIG. 3, there is a negative correlation between an average width of surface crystal grains and a tensile strength. In other words, as the average width of surface crystal grains decreases, the tensile strength increases. In particular, as can be seen by comparing Working Example 2 with Working Example 3, even when the diameter is the same 32 μm and the tungsten content is the same 99.5 wt %, the tensile strength can be different as a result of the average width of the surface crystal grains being different. It should be noted that the average width of the surface crystal grains is adjusted by varying the processing rate of drawing at room temperature. More specifically, the higher the processing rate of drawing at room temperature, the smaller the average width of the surface crystal grains, making it possible to enhance the tensile strength.

FIG. 3 also illustrates a plurality of samples each having a diameter of 50 μm (Working Examples 6 to 8) as circled plots. The relationship between the average width of the surface crystal grains and the tensile strength of each of Working Examples 6 to 8 is indicated in Table 2.

TABLE 2

| | Tensile strength [MPa] | Total number of grain boundaries | Average width of surface crystal grains [nm] | Re content [wt %] |
|---|---|---|---|---|
| Working Example 6 | 4800 | 21 | 76 | 1 |
| Working Example 7 | 5040 | 25 | 65 | 1 |
| Working Example 8 | 5430 | 28 | 56 | 1 |

When the relationship between the tensile strength and the average width of the surface crystal grains of the samples according to Working Examples 6 to 8 is calculated by polynomial approximation, the following Expression (1) is satisfied where: T is the tensile strength in MPa; and W is the average width of the surface crystal grains in nm.

$$T=0.3088\times W^2-72.798\times W+8516.8 \quad (1)$$

Although the coefficients of Expression (1) vary with different diameters of the tungsten wire, there is no change in the fact that there is a negative correlation between tensile strength T and average width of surface crystal grains W. Moreover, even in the case where the diameters differ significantly, as illustrated in FIG. 3, the relationship between tensile strength T and average width of the surface crystal grains W is approximately within the range of from −500 MPa to +200 MPa based on the curve indicated in Expression (1). In other words, regardless of the diameter, tensile strength T and average width of the surface crystal grains W satisfy the relationship indicated by the inequality of the following Expression (2).

$$0.3088\times W^2-72.798\times W+8016.8\leq T\leq 0.3088\times W^2-72.798\times W+8716.8 \quad (2)$$

As described above, it is possible to implement a tungsten wire having a high tensile strength, by reducing the average width of the surface crystal grains.

Diameter

Next, the relationship between the tensile strength and diameter of a tungsten wire.

Figure 4:
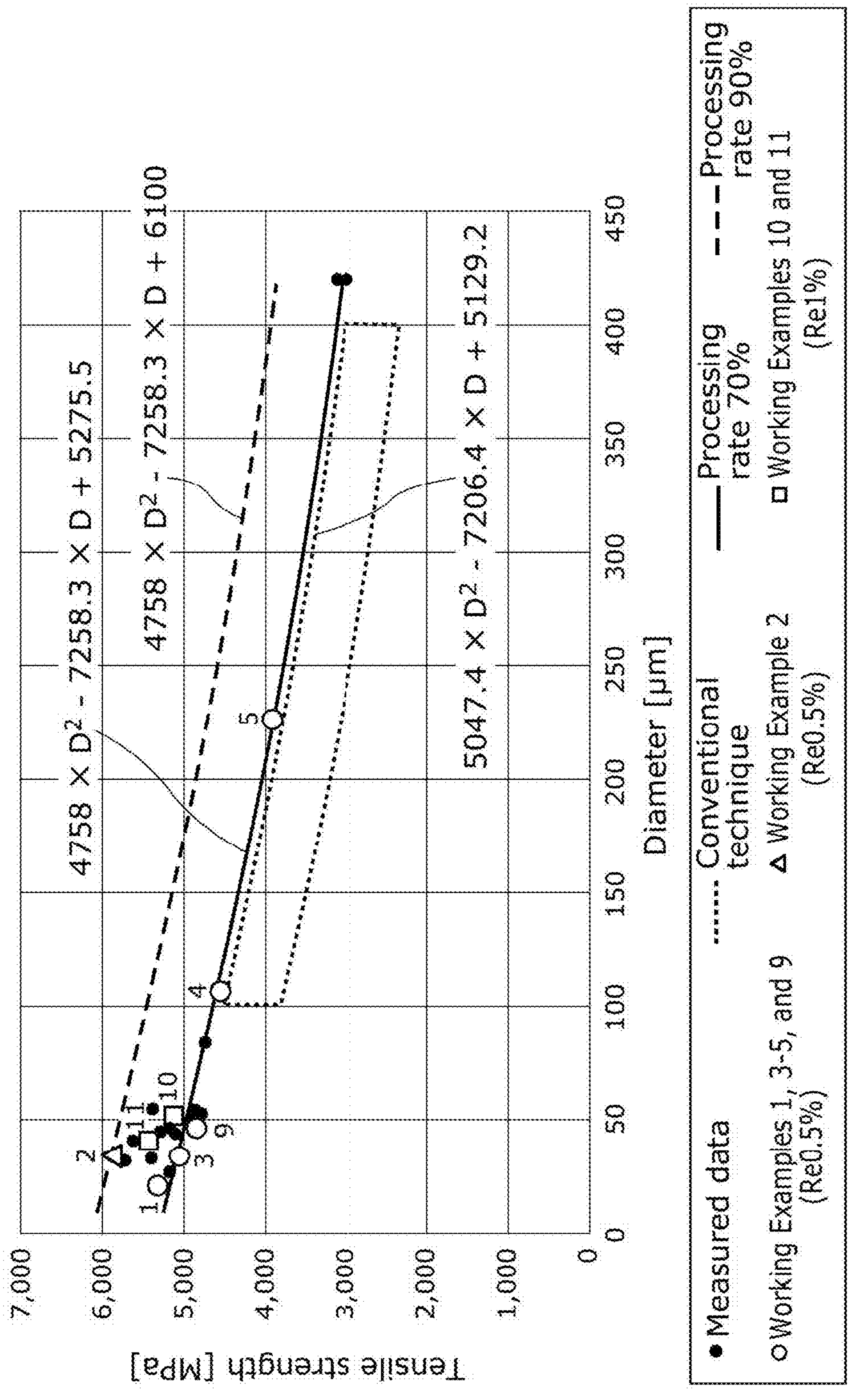
FIG. 4 is a diagram illustrating a relationship between a diameter and a tensile strength.

FIG. 4 is a diagram illustrating a relationship between a diameter and a tensile strength. In FIG. 4, the horizontal axis represents the diameter of a tungsten wire in μm and the vertical axis represents the tensile strength of the tungsten wire in MPa. The numerical values 1 to 5, and 9 to 11 provided beside the respective plots in FIG. 4 mean that the respective plots are the results of the measurements of the respective Working Examples 1 to 5, and 9 to 11.

As illustrated in FIG. 4, there is a negative correlation between the diameter and the tensile strength. In other words, the tensile strength increases with a decrease in diameter, and decreases with an increase in diameter.

With the tungsten wire according to the present embodiment, the following Expression (3) is satisfied where D is the diameter in mm.

$$4758\times D^2-7258.3\times D+5275.5\leq T\leq 4758\times D^2-7258.3\times D+6100 \quad (3)$$

The quadratic function on the left side of the inequality in Expression (3) is represented by the solid line in FIG. 4. The solid line in FIG. 4 was obtained by polynomial approximation using plots with a 70% processing rate of drawing at room temperature (the five plots indicated by circles). The five plots indicated by circles correspond to Working Examples 1, and 3 to 5 indicated in Table 1 and Working Example 9 indicated in Table 3.

TABLE 3

| | Tensile strength [MPa] | Diameter [μm] | Re content [wt %] | Processing rate [%] |
|---|---|---|---|---|
| Working Example 9 | 4800 | 45 | 0.5 | 70 |
| Working Example 10 | 5033 | 50 | 1 | 70 |
| Working Example 11 | 5380 | 40 | 1 | 80 |

The quadratic function on the right side of the inequality in Expression (3) is represented by the dashed line in FIG. 4. The dashed line in FIG. 4 is a line that is shifted parallelly from the solid line indicated in FIG. 4, and passes through the triangular plot corresponding to Working Example 2 (90% processing rate of drawing at room temperature). In other words, even with the same diameter, it is possible to increase the tensile strength by increasing the processing rate of drawing at room temperature.

It should be noted that, in FIG. 4, the range that satisfies the conventional relationship between the diameter and tensile strength disclosed in PTL 1 is indicated by the dotted line box. According to the present embodiment, it is possible to implement a tungsten wire having a higher tensile strength than the conventional one, by increasing the processing rate of drawing at room temperature to 70% or higher and adjusting the average width of the surface crystal grains.

Rhenium Content

The following descries the relationship between rhenium content and a diameter in a tungsten wire.

In FIG. 4, Working Examples 10 and 11 indicated in FIG. 3 are represented by plots of square marks. As is clear from FIG. 4, a crystal grain of the rhenium-tungsten alloy tend to be smaller as the rhenium content is increased, even at the same diameter. This allows increasing the tensile strength of the tungsten wire.

As described above, when the rhenium content is excessively high, rendering the tungsten wire thinner while maintaining the high tensile strength causes wire breakage, making it difficult to perform drawing in long lengths. According to the conventional techniques, rhenium is contained at 10 wt % or more so as to increase the tensile strength of the tungsten wire. In such a case where a large amount of rhenium is contained, it is difficult to implement a tungsten wire with a diameter of less than 100 μm. In addition, according to the present embodiment, a higher tensile strength than those of the conventional techniques is achieved even with a rhenium content of approximately only 0.5 wt % or 1 wt % or a tungsten wire of 99.5 wt % or higher.

Manufacturing Method of Tungsten Wire

Figure 5:
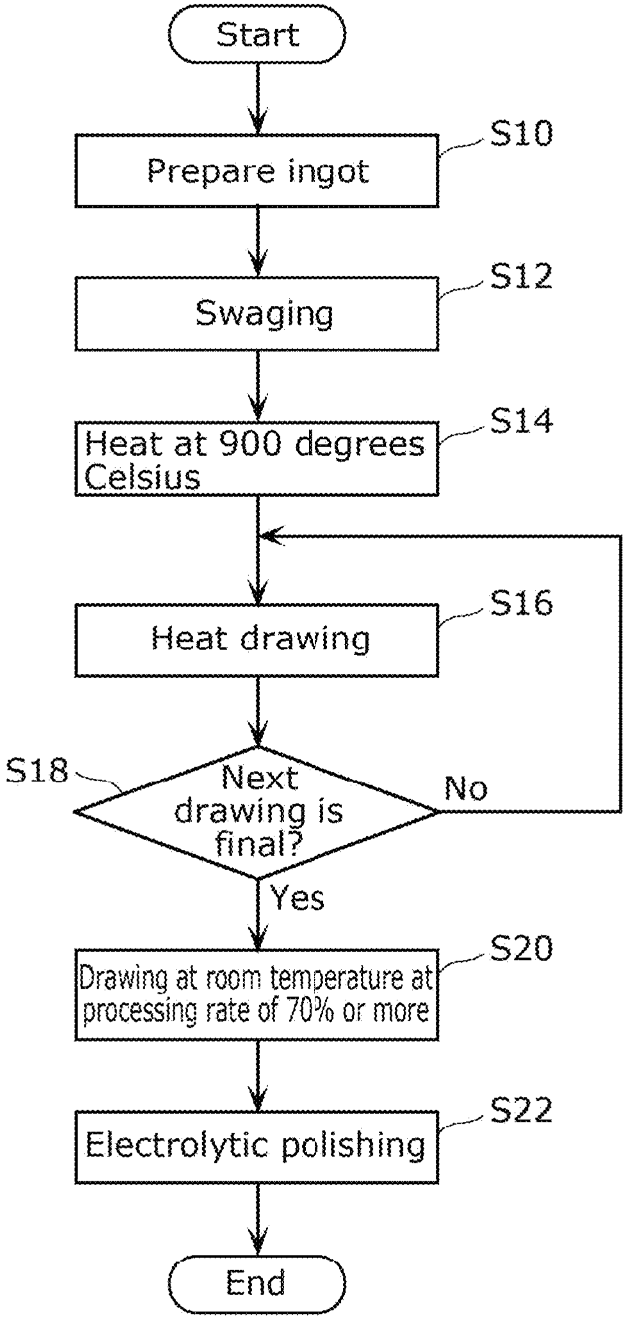
FIG. 5 is a flowchart illustrating a manufacturing method of the tungsten wire according to the embodiment.

Next, a manufacturing method of tungsten wire 10 according to the present embodiment will be described with reference to FIG. 5. FIG. 5 is a flowchart illustrating the manufacturing method of tungsten wire 10 according to the present embodiment.

As illustrated in FIG. 5, first, a tungsten ingot is prepared (S10). More specifically, a tungsten ingot is manufactured by preparing an aggregation of tungsten powders and pressing and sintering the prepared aggregation of tungsten powders.

It should be noted that, when tungsten wire 10 containing a tungsten alloy is manufactured, a mixture resulting from mixing tungsten powders and metal powders (rhenium powders, for example) at a predetermined proportion is prepared instead of the aggregation of tungsten powders. An average grain diameter of a tungsten powder and a rhenium powder is in a range of from at least 3 μm to at most 4 μm, for example, but not limited to this example.

Next, swaging processing is applied to the manufactured tungsten ingot (S12). More specifically, the tungsten ingot is press-forged from its periphery and extended to be a tungsten wire having a wire shape. Instead of the swaging processing, the tungsten ingot may be subjected to rolling processing.

For example, a tungsten ingot having a diameter of approximately at least 15 mm and approximately at most 25 mm is shaped into a tungsten wire having a diameter of approximately 3 mm, by repeatedly applying the swaging processing to the tungsten ingot. Annealing is performed during the swaging processing to ensure workability in the subsequent processes. For example, annealing at 2400 degrees Celsius is performed in a diameter range of from at least 8 mm to at most 10 mm. However, in order to ensure a tensile strength by crystal grain refinement, annealing is not performed in the swaging processing with a diameter less than 8 mm.

Next, prior to heat drawing, the tungsten wire is heated at 900 degrees Celsius (S14). More specifically, the tungsten wire is heated directly by a burner or the like. An oxide layer is formed on the surface of the tungsten wire by heating the tungsten wire, to prevent wire breakage during the processing in the subsequent heat drawing.

Next, heat drawing is carried out (S16). More specifically, drawing of the tungsten wire, namely, a wire drawing process (thinning) of the tungsten wire, is performed using at least one wire drawing die, while heating is performed. A heating temperature is, for example, 1000 degrees Celsius. The workability of a tungsten wire can be enhanced as the heating temperature increases, and thus it is possible to easily perform the drawing. Heat drawing is repeatedly performed while changing the wire drawing die. The reduction rate in a cross-section area of the tungsten wire by one drawing using a single wire drawing die is, for example, at least 10% and at most 40%. In the heat drawing processing, a lubricant including graphite dispersed in water may be used.

The heat drawing (S16) is repeatedly performed until a tungsten wire having a desired diameter is obtained (No in S18). Here, the desired diameter is a diameter at the stage immediately before performing the final drawing processing (S20), and is at most 712 μm, for example.

In the repeating of heat drawing, a wire drawing die having a smaller pore diameter than a pore diameter of a wire drawing die used in the immediately-before drawing is used. In addition, in the repeating of the heat drawing, the tungsten wire is heated at a heating temperature lower than a heating temperature of the immediately-before drawing. For example, the heating temperature in drawing processing immediately before the final drawing processing is lower than any previous heating temperatures, and is, for example, 400 degrees Celsius, which contributes to refinement of crystal grains.

When a tungsten wire having a desired diameter is obtained, and the next drawing processing is the final drawing processing (Yes in S18), drawing at room temperature is carried out at the processing rate of 70% or higher (S20). More specifically, a tungsten wire is drawn without heating, thereby achieving further refinement of crystal grains. In addition, the drawing at room temperature yields an advantageous effect of aligning crystal orientations in a processing axis direction (specifically, a direction parallel to axis P). The room temperature is, for example, a temperature in a range of from at least 0 degrees Celsius to at most 50 degrees Celsius, and is 30 degrees Celsius as one example. More specifically, the tungsten wire is drawn using a plurality of wire drawing dies having different pore diameters. In the drawing at room temperature, a liquid lubricant such as a water-soluble lubricant is used. Since heating is not carried out in the drawing at room temperature, liquid evaporation is inhibited. Accordingly, a sufficient function as a liquid lubricant can be exerted. In contrast to the heat drawing at 600 degrees Celsius or higher which is the traditional tungsten wire processing method conventionally performed, the tungsten wire is not heated and is processed while being cooled with the liquid lubricant. As a result, it is possible to inhibit dynamic recovery and dynamic recrystallization, contribute to the refinement of crystal grains without wire breakage, and achieve a high tensile strength.

The processing rate is represented by the following Expression (4) using diameter Db immediately before the drawing at room temperature and diameter Da immediately after the drawing at room temperature.

$$\text{Processing rate}=\{1-(Da/Db)^2\}\times 100 \tag{4}$$

As can be seen from Expression (4), the larger the wire diameter is reduced by drawing at room temperature, the larger the processing rate becomes. For example, even when diameter Db immediately before the drawing at room temperature is the same, the larger the processing rate is, the smaller diameter Da immediately after the drawing at room temperature becomes. As a result of increasing the processing rate, the degree of thinning of the tungsten wire by drawing at room temperature is increased, i.e., a thinner tungsten wire is obtained. The processing rate of the drawing at room temperature is 70% or higher, but may be 80% or higher, 90% or higher, or 95% or higher.

In order to obtain a tungsten wire having a diameter larger than 100 μm immediately after the drawing at room temperature, the diameter immediately before the drawing at room temperature may be increased. For example, in order to obtain a tungsten wire having a diameter of approximately 100 μm at a processing rate of 70% of drawing at room temperature, drawing at room temperature may be started on a tungsten wire having a diameter of approximately 183 μm, according to Expression (4).

The processing rate of the drawing at room temperature can be changed by adjusting the shape and a total number of dies used for drawing. It should be noted that, as for the wire drawing die to be used, for example, a carbide die is used for diameters up to 0.38 mm, a sintered diamond die is used for diameters in the range of from 0.38 mm to 0.18 mm, and a monocrystalline diamond die is used for diameters in the range of from 0.18 mm to 0.018 mm.

Lastly, electrolytic polishing is performed for fine tuning of the diameter. on the tungsten wire having a desired diameter resulting from the drawing at room temperature (S22). The electrolytic polishing is carried out, for example, as a result of generation of a potential difference between a tungsten wire and a counter electrode in a state in which the tungsten wire and the counter electrode are bathed into electrolyte, e.g., aqueous sodium hydroxide.

Through the above-described processes, tungsten wire 10 according to the present embodiment is manufactured. Through the above-described manufacturing processes, tungsten wire 10 immediately after manufacturing has a length of, for example, at least 50 km, and thus is industrially applicable. Tungsten wire 10 can be cut to a suitable length according to the aspect in which tungsten wire 10 is to be used, and can also be used in a shape of a needle or a stick. As described above, according to the present embodiment, it is possible to industrially mass-produce tungsten wire 10 to be used in various areas such as medical needles, saw wires, screen printing meshes, etc.

Tungsten wires 10 according to Working Examples 1 to 11 are tungsten wires manufactured through the above-described processes. The tungsten wire according to each of the working examples can be produced by adjusting the rhenium content, the processing rate of the drawing at room temperature, and the diameter, as appropriate.

Each of the processes indicated in the manufacturing method of tungsten wire 10 is carried out, for example, as an in-line process. More specifically, the plurality of wire drawing dies used in Step S16 are arranged in descending order of pore diameters in a production line. Furthermore, a heating device such as a burner is disposed between the respective wire drawing dies. In addition, an electrolytic polishing device may be disposed between the respective wire drawing dies. The plurality of wire drawing dies used in Step S20 are arranged in descending order of pore diameters on the downstream side (i.e., the subsequent-process side) of the wire drawing dies used in Step S16, and the electrolytic polishing device is disposed on the downstream side of the wire drawing die having the smallest pore diameter. It should be noted that each of the processes may be individually performed.

Saw Wire

Figure 6:
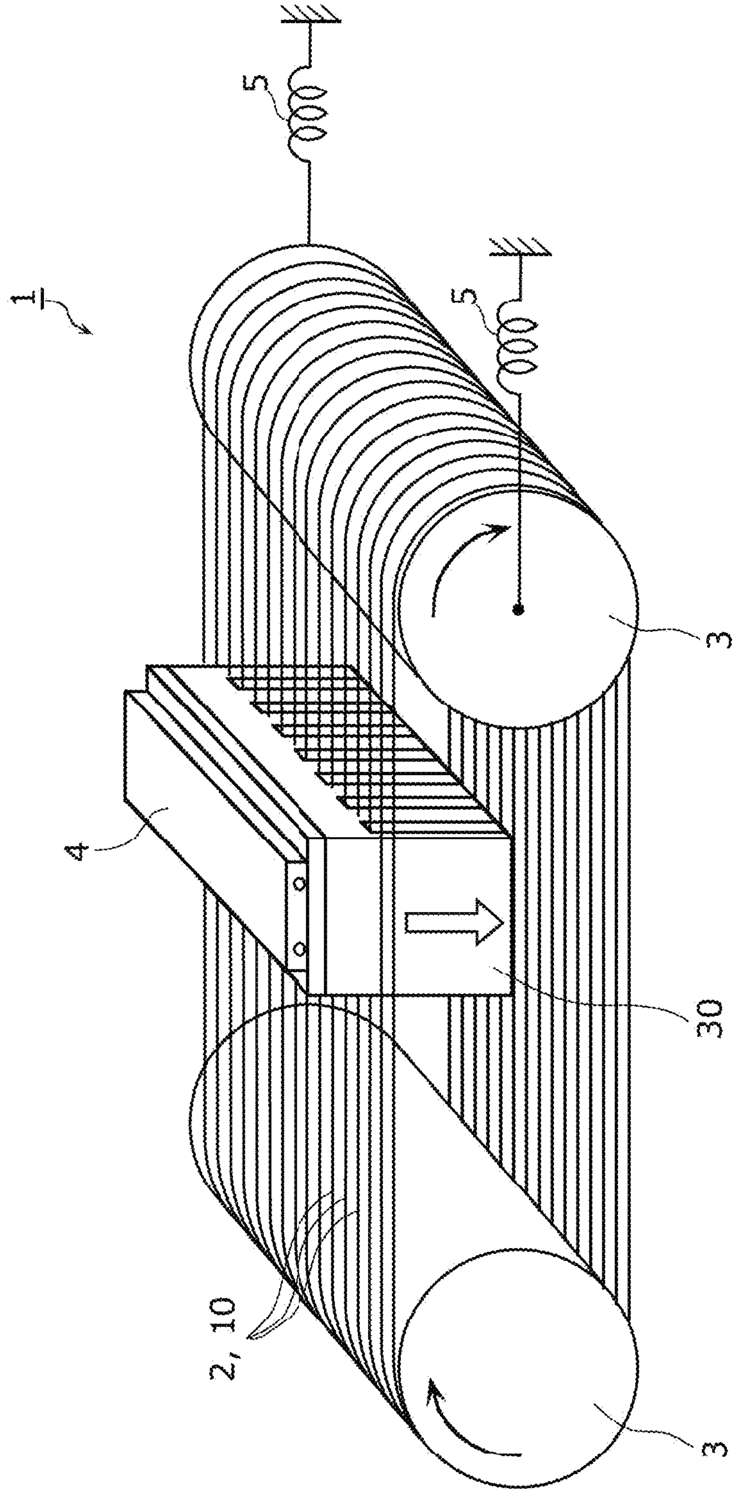
FIG. 6 is a perspective view illustrating a cutting apparatus according to the embodiment.

Tungsten wire 10 according to the present embodiment can be used, for example, as saw wire 2 of cutting apparatus 1 that cuts an object such as a silicon ingot or concrete as illustrated in FIG. 6. FIG. 6 is a perspective view illustrating cutting apparatus 1 according to the present embodiment.

As illustrated in FIG. 6, cutting apparatus 1 is a multi-wire saw including saw wire 2. Cutting apparatus 1 produces wafers by, for example, cutting ingot 30 into thin slices. Ingot 30 is, for instance, a silicon ingot including single-crystal silicon. More specifically, cutting apparatus 1 simultaneously produces a plurality of silicon wafers by slicing ingot 30 using a plurality of saw wires 2.

It should be noted that ingot 30 is a silicon ingot but is not limited to such. For example, an ingot including other substance such as silicon carbide or sapphire may be employed. Alternatively, an object to be cut by cutting apparatus 1 may be concrete, glass, etc.

According to the present embodiment, saw wire 2 includes tungsten wire 10. More specifically, saw wire 2 is quite simply tungsten wire 10 according to the present embodiment. Alternatively, saw wire 2 may include tungsten wire 10 and a plurality of abrasive particles included in a surface of tungsten wire 10.

As illustrated in FIG. 6, cutting apparatus 1 further includes two guide rollers 3, ingot holder 4, and tension releasing device 5.

A single saw wire 2 is looped multiple times over and across two guide rollers 3. Here, for convenience of explanation, one loop of saw wire 2 is regarded as one saw wire 2, and it is assumed that a plurality of saw wires 2 are looped over and across two guide rollers 3. Stated differently, in the description below, the plurality of saw wires 2 form a single continuous saw wire 2. It should be noted that the plurality of saw wires 2 may be a plurality of saw wires that are separated from one another.

Each of the two guide rollers 3 rotates in a state in which the plurality of saw wires 2 are straightly tightened with a predetermined tension, and thereby causes the plurality of saw wires 2 to rotate at a predetermined speed. The plurality of saw wires 2 are disposed in parallel to one another and are equally spaced. More specifically, each of the two guide rollers 3 is provided with grooves positioned at predetermined intervals for saw wires 2 to fit in. The intervals between the grooves are determined according to the thickness of the wafers desired to be sliced off. The width of the groove is substantially the same as the diameter of saw wire 2.

It should be noted that cutting apparatus 1 may include three or more guide rollers 3. Saw wires 2 may be looped over and across the three or more guide rollers 3.

Ingot holder 4 holds ingot 30 which is an object to be cut. Ingot holder 4 pushes ingot 30 through saw wires 2, and thereby ingot 30 is sliced by saw wires 2.

Tension releasing device 5 is a device that releases tension exerted on saw wire 2. Tension releasing device 5 is, for example, an elastic body such as a coiled spring or a plate spring. As illustrated in FIG. 6, tension releasing device 5 that is a coiled spring, for example, has one end connected to guide roller 3 and the other end fixed to a given wall surface. Tension releasing device 5 is capable of releasing the tension exerted on saw wire 2, by adjusting the position of guide roller 3.

It should be noted that, although not illustrated in the diagram, cutting apparatus 1 may be a cutting apparatus of a free abrasive particle type, and may include a feeder that feeds slurry to saw wires 2. The slurry is a cutting fluid such as a coolant including abrasive particles dispersed therein. The abrasive particles included in the slurry are fixed to saw wire 2, and thereby it is possible to easily cut ingot 30.

Saw wire 2 including tungsten wire 10 having a high tensile strength can be looped over and across guide rollers 3 with a strong tension. In this manner, vibrations of saw wire 2 caused during the process of cutting ingot 30 are inhibited, and thus it is possible to reduce the kerf loss of ingot 30.

Screen Mesh

Tungsten wire 10 according to the present embodiment can also be used as a tungsten wire for screen printing. More specifically, as illustrated in FIG. 7, tungsten wire 10 according to the present embodiment can also be used as a metal mesh wire member of screen mesh 40, etc. for use in screen printing.

Figure 7:
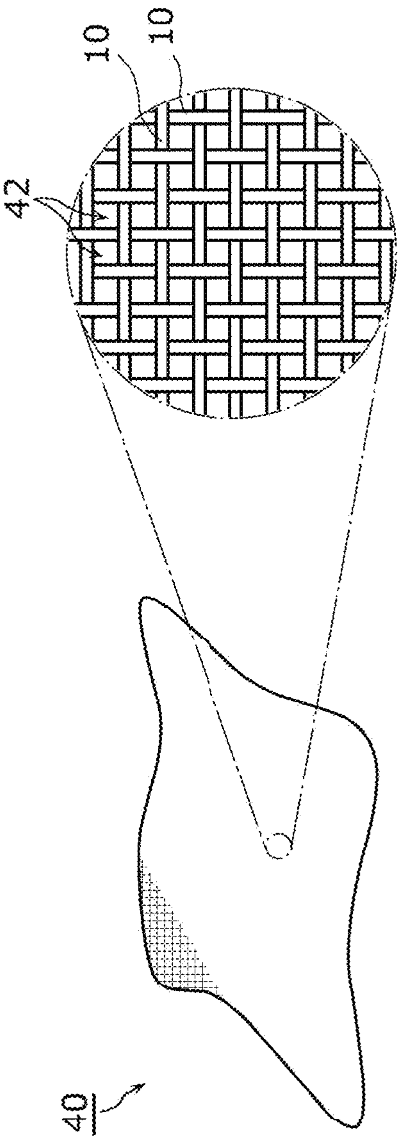
FIG. 7 is a perspective view illustrating a screen mesh according to the embodiment.

FIG. 7 is a diagram illustrating screen mesh 40. In FIG. 7, the mesh is schematically illustrated only on a portion of screen mesh 40, but the entire screen mesh 40 is in a mesh-like state. For example, screen mesh 40 includes a plurality of tungsten wires 10 woven as warp and weft yarns.

Screen mesh 40 includes a plurality of openings 42. Openings 42 are each the portion through which ink passes in screen printing. By partially blocking opening 42 with an emulsion or resin (e.g., polyimide), a non-passing portion through which ink cannot pass is formed. By patterning the shape of the non-passing portion into any desired shape, screen printing can be performed in the desired shape.

It should be noted that the tungsten wire for screen printing may include tungsten wire 10 and a coating layer covering the surface of tungsten wire 10. The coating layer is provided so as to enhance the retention of emulsion, for example.

Advantageous Effect, Etc.

As described above, tungsten wire 10 according to the present embodiment contains tungsten or a tungsten alloy. An average width of surface crystal grains in a direction perpendicular to axis P of tungsten wire 10 is at most 98 nm, Tungsten wire 10 has a tensile strength of at least 3900 MPa. A diameter of tungsten wire 10 is larger than 100 μm and at most 225 μm.

According to this configuration, it is possible to implement a higher tensile strength than a general tensile strength of piano wire, for a tungsten wire having a diameter larger than 100 μm as well.

In addition, for example, tungsten wire 10 according to the present embodiment has a diameter of at least 18 μm and at most 225 μm, and $T \geq 4758 \times D^2 - 7258.3 \times D + 5275.5$ is satisfied where: T is the tensile strength in MPa; and D is the diameter in mm.

Although it is possible to increase a tensile strength with decreasing diameter according to the conventional techniques as well, the present embodiment is capable of implementing a higher tensile strength than a tensile strength implemented by the conventional techniques at each of the diameters.

In addition, for example, a tungsten content of tungsten wire 10 is at least 99 wt %.

According to this configuration, it is possible to allow the content of alloy materials such as rhenium to be equal to or less than 1% even in the case of alloying. For example, the reduced rhenium content facilitates thinning of wires while maintaining the strength, and thus it is possible to implement a tungsten wire that is thinner and has a higher tensile strength than conventional wires.

It should be noted that tungsten wire 10 can be used also as a medical needle or an inspection probe needle, in addition to saw wire 2 or screen mesh 40. Furthermore, tungsten wire 10 can be used also as, for example, a reinforcement wire for an elastic component such as a tire, a conveyer belt, or a catheter. For example, a tire includes a plurality of tungsten wires 10 bundled in layers as a belt or carcass ply.

Others

Although the tungsten wire, the saw wire, and the tungsten wire for screen printing according to the present invention have been described thus far based on the above-described embodiment, the present invention is not limited to the above-described embodiment.

For example, the metal contained in the tungsten alloy need not be rhenium. In other words, the tungsten alloy may be an alloy of tungsten and metal of at least one type different from tungsten. The metal different from tungsten is, for example, a transition metal, such as iridium (Ir), ruthenium (Ru), or osmium (Os). The content of the metals described above is, for example, at least 0.1 wt % and at most 1 wt %, but is not limited to this example. For example, the content of the metal different from tungsten also may be less than 0.1 wt % or may be greater than 1 wt %. The same holds true for rhenium.

In addition, for example, tungsten wire 10 may contain tungsten doped with potassium (K). Potassium in tungsten wire 10 is present in the grain boundaries of tungsten. Potassium (K) dispersed in the grain boundaries inhibits crystal coarsening during high-temperature heating and during processing of heat drawing. However, crystal coarsening during processing does not occur in drawing at room temperature, and thus the amount of potassium (K) may be any amount in a range of from at least 0.005 wt % to at most 0.01 wt %, for example. With a potassium-doped tungsten wire, as in the case of the tungsten alloy wire, it is possible to implement a tungsten wire having a tensile strength that is higher than the general tensile strength of piano wires.

The potassium-doped tungsten wire can be manufactured through a manufacturing method equivalent to the manufacturing method of the embodiment, by using a doped tungsten powder doped with potassium instead of a tungsten powder.

In addition, for example, the surface of tungsten wire 10 may be coated by an oxide film, a nitride film, or the like.

Additionally, embodiments arrived at by those skilled in the art making modifications to the above embodiment, as well as embodiments arrived at by combining various structural components and functions described in the above embodiment without materially departing from the novel teachings and advantages of the present invention are intended to be included within the scope of the present invention.

The invention claimed is:

1. A tungsten wire containing tungsten or a tungsten alloy, wherein an average width of surface crystal grains in a direction perpendicular to an axis of the tungsten wire is at most 98 nm, a tensile strength of the tungsten wire is at least 3900 MPa, and a diameter of the tungsten wire is larger than 100 μm and at most 225 μm, and a tungsten content of the tungsten wire is at least 99 wt %.

2. A screen mesh comprising a plurality of tungsten wires each being the tungsten wire according to claim 1.

3. A tungsten wire containing tungsten or a tungsten alloy, wherein an average width of surface crystal grains in a direction perpendicular to an axis of the tungsten wire is at most 98 nm, a tensile strength of the tungsten wire is at least 3900 MPa, a diameter of the tungsten wire is at least 18 μm and at most 225 μm, and $T \geq 4758 \times D^2 - 7258.3 \times D + 5275.5$ is satisfied where T is the tensile strength in MPa and D is the diameter in mm.

4. A saw wire comprising a tungsten wire containing tungsten or a tungsten alloy, wherein an average width of surface crystal grains in a direction perpendicular to an axis of the tungsten wire is at most 98 nm, a tensile strength of the tungsten wire is at least 3900 MPa, and a diameter of the tungsten wire is larger than 100 μm and at most 225 μm.

* * * * *